United States Patent [19]

Duran

[11] Patent Number: 4,574,874

[45] Date of Patent: Mar. 11, 1986

[54] CHEMISORPTION AIR CONDITIONER

[75] Inventor: Melchor Duran, Babylon, N.Y.

[73] Assignee: Pan Tech Management Corp., Babylon, N.Y.

[21] Appl. No.: 482,860

[22] Filed: Apr. 7, 1983

[51] Int. Cl.[4] .......................... B60H 1/06; B60H 1/32; F25B 15/00

[52] U.S. Cl. .................. 165/43; 165/104.12; 165/86; 62/112; 62/480; 62/485; 62/481; 62/478; 62/239; 62/243

[58] Field of Search ...................... 165/104.12, 104.15, 165/104.18, 42, 43, 86; 62/112, 476–482, 485, 243, 239

[56] References Cited

U.S. PATENT DOCUMENTS

| | | |
|---|---|---|
| 1,169,675 | 1/1916 | Pfleiderer . |
| 1,472,432 | 10/1923 | Davenport . |
| 1,790,757 | 2/1931 | Miller . |
| 1,821,509 | 9/1931 | Gay ........................ 62/482 |
| 2,287,172 | 6/1942 | Harrison et al. ...................... 62/480 |
| 2,344,384 | 3/1944 | Altenkirch . |
| 2,817,416 | 12/1957 | Smith, Jr. ........................ 165/10 |
| 3,125,159 | 3/1964 | Lindberg, Jr. .................. 165/104.12 |
| 3,334,685 | 8/1967 | Burggraf et al. ...................... 165/86 |
| 4,121,432 | 10/1978 | Weil et al. ............................. 62/480 |
| 4,135,371 | 1/1979 | Kesselring et al. ............... 165/104.12 |
| 4,291,755 | 9/1981 | Minto ............................. 165/104.12 |
| 4,372,376 | 2/1983 | Nelson et al. .................. 165/104.12 |
| 4,402,915 | 9/1983 | Nishizaki et al. ............... 165/104.12 |

FOREIGN PATENT DOCUMENTS

| | | | |
|---|---|---|---|
| 582817 | 10/1924 | France .................................. 62/481 |
| 667689 | 6/1929 | France .................................. 62/481 |
| 108955 | 8/1979 | Japan ............................... 165/104.12 |
| 7804371 | 10/1979 | Netherlands ................... 165/104.12 |

OTHER PUBLICATIONS

Althouse et al., A. D. *Modern Refrigeration* Goodheart-Willcox Co., South Holland, Ill., pp. 1, 2, 93, 94; 1975.

*Primary Examiner*—Albert W. Davis, Jr.
*Attorney, Agent, or Firm*—Leighton K. Chong

[57] ABSTRACT

A chemisorption thermal system provides a cooling output by revolving an array of thermal elements through heat sink and heat source temperature zones defined within a cylindrical housing. Each thermal element is an enclosed elongated body having an absorbent material at one end and a reactant containing part at the other end. Reactant is desorbed from the absorbent material in one part of the thermal cycle, and then evaporated from the reactant containing part to provide a cooling output in another part of the cycle. It is particularly suitable as a vehicle air conditioner using the engine waste heat as a heat source and the vehicle radiator as a heat sink. The invention also makes use of dry chemical absorbent materials which have high heats of reaction allowing the system to have a high heat capacity and low volume. The thermal cycle may be reversed to provide a heating output.

27 Claims, 6 Drawing Figures

CHEMISORPTION AIR CONDITIONER

This invention relates to an apparatus for providing a heating or cooling output through chemical absorption (or chemisorption). In particular, this invention relates to a new vehicle air cooling system using waste heat from the vehicle's engine to drive the chemisorption cooling cycle. The invention also makes use of dry chemical absorbent materials which have high heats of reaction representing high levels of cooling energy, and provides a compact, low-demand system design.

BACKGROUND

Conventional air-conditioning systems cool an input air stream by heat exchange with a coil carrying refrigerant material cooled in a cycle of evaporation, compression, heat exchange, and condensation. Such systems are generally costly, of large size, and require large amounts of energy to operate. For vehicle air conditioning systems particularly, the conventional compressor presents a heavy demand on the vehicle's power output. The high power requirement results in lowered vehicle power, reduced miles-per-gallon performance, engine overheating and radiator boilovers under extreme conditions.

Some alternative air cooling systems have used the physical adsorption of water or water vapor from air by dry or liquid adsorbent materials, followed by rehumidification, to produce a cooled air output. These systems make use of the release of heat through the physical bonding of water molecules to adsorbent materials, typically brines, glycols, salt hydrates, alumina, zeolites, and other hygroscopic (water-seeking) materials. One form of liquid adsorption system is described, for example, in Robison U.S. Pat. No. 4,287,721, or in Griffiths U.S. Pat. No. 4,164,125. For cooling, the hot, humid incoming air is adiabatically or (in some systems) isothermally dehumidified through the adsorbent, with the heat of adsorption and some sensible heat being discharged from the system. The dehumidified air is then typically evaporatively cooled through rehumidification with water.

However, the known systems are essentially one-way in operation and require a separate and large volume regenerator system to periodically reconcentrate the diluted absorbent material, typically through contact with solar heat or some other form of cyclical or daily heat input. These liquid systems also have other disadvantages in terms of: the limited range of operating temperatures or pressures; a relatively limited stored energy capacity through physical adsorption in the range of about 1000 calories per mole; and the required pumping of large volumes of liquid adsorbent into contact with the air stream to be conditioned and during regeneration. These prior systems are particularly unsuited for vehicle air cooling, where compactness and short cycling times are required.

Some types of absorption air conditioners have been tried for automotive use, but they have been found to possess many disadvantages. If they are designed to work using the engine hot water as heat source and the radiator as heat sink, their size becomes too large to be practical. If designed to use the heat of exhaust gases, the size of the system is large, and it does not provide enough heat input during slow moving traffic conditions. Such systems also use liquid absorbents which have a delicate equilibrium sensitive to vibration and acceleration.

By employing chemical compounds having high heat of chemical reaction capacities, as described for example in U.S. Pat. No. 3,075,361 or in the work of Argonne National Laboratory using alkaline or metal hydrides as the heat transfer media, energy potentials of the order of about 10,000 calories per mole or more have been obtained. However, these materials have a high cost and are not considered economically attractive for commercial uses. They also require high temperature heat to regenerate the absorbent material.

It is therefore a principal object of this invention to provide an improved chemisorption apparatus for heating or cooling that has a high heat transfer capacity and yet is inexpensive and simple in design and operation. It is further a specific objective herein to provide a compact and economical vehicle air conditioning system that presents a low demand on the vehicle's power output and uses the vehicle's waste heat as its primary energy source.

SUMMARY OF THE INVENTION

As an underlying principle of my invention, a compact, enclosed chemisorption heating or cooling system has a housing divided into temperature zones, and an array of thermal elements rotatable in the housing in a thermal cycle. Each element contains a dry chemical absorbent material arranged in a lower part of the element in a mesh, wick, porous structure, or other matrix. The element also contains a reactant vapor or gas which combines chemically with the absorbent material releasing heat during the absorption phase of the thermal cycle. During the regeneration phase, the reactant is desorbed from the absorbent in vapor form and moves to an upper part of the thermal element. The array is rotated in the housing in a periodic cycle from absorption to desorption. As a cooling system, the lower parts of the elements are first exposed to high temperature heat to desorb the reactant from the absorbent. They are then cycled to a low temperature zone in contact with a heat sink, whereby the reactant is absorbed and the heat of chemical absorption is discharged to a heat sink. Absorption of the reactant results in cooling output at the upper parts of the thermal elements.

The invention is particularly suitable as a vehicle air conditioner. The engine coolant recirculation system is used to provide the engine's waste heat as the high temperature input for the desorption step. The vehicle's radiator or a separated part thereof is used as a heat exchanger to the ambient air as a heat sink for removing the heat of chemical absorption in the absorption step. A coolant medium transfers the cooling output to a fan coil for the passenger compartment. As provided in this invention, absorbent materials having a high reaction heat per volume are used so that the thermal element array can be compact to fit easily in the available space of an engine compartment. A cylindrical housing encloses the array and is connected to the engine circulation system and radiator. By this arrangement, the conventional air conditioner compressor is eliminated, and the only power requirements for the system are a small drive for cycling the array, water pumps, and a blower for the cool air.

In accordance with a further part of my invention, the chemisorption air conditioning system uses improved dry absorbents, such as an alkaline or alkalinotferrous halide, calcium chloride, lithium chloride, sodium bioxalate, or ammoniacates, that combine chemically with reactant into another solid form. These materials are generally of low cost and have high heats of reaction. Other similar materials which react with water vapor (or other reactants) may also be used. The dry absorbent is held in each thermal element by a matrix or binder, or suspended in a wick, mesh, or other porous structure which allows high penetration and mass transfer of the reactant material.

DESCRIPTION OF THE DRAWINGS

FIG. 4 illustrates a form of interior construction for an absorption element of the array depicted in FIG. 1a.

DETAILED DESCRIPTION

Figure 1A:
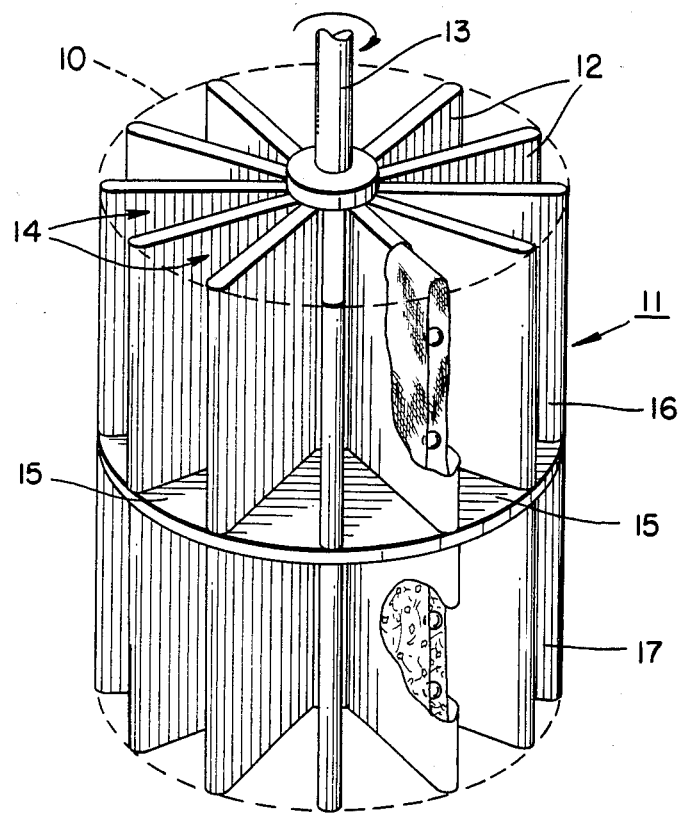
FIG. 1a is a schematic diagram illustrating one form of the thermal array for the apparatus of the invention.

The invention encompasses all of the following aspects: a chemisorption apparatus for heating or cooling having an array of absorbent-containing thermal elements rotatable within a housing through temperature zones for cycling the elements between absorption and desorption; a vehicle air conditioner as above wherein the primary energy input is waste heat from the engine; the described chemisorption apparatus wherein each element of the array is a thin, evacuated fin having dry absorbent material held in a matrix or porous structure in the lower part thereof; and the described chemisorption apparatus using selected dry chemical absorbent materials. The following description of specific embodiments of the invention, illustrated in the drawings, is exemplary of its principles, and not intended to limit the scope of the invention.

Referring to FIG. 1a, a chemisorption apparatus for heating or cooling in accordance with the invention comprises a cylindrical housing 10 and a coaxial array 11 of a plurality of absorbent-containing thermal elements 12, extending to the walls of the housing 10 and adapted for rotation therein. The array 11 is rotatably fixed to a drive shaft 13 extending from the housing. The drive shaft is driven by an external motor or power source not shown in the drawing.

The interior of the housing 10 is divided by the elements 12 into a radial series of channels 14 extending longitudinally between each pair of adjacent elements. The elements 12 also have horizontal dividers 15 between each pair of adjacent elements which separate the housing into an upper part 16 and a lower part 17. Each element 12 contains an absorbent material in a lower part thereof which absorbs or desorbs a reactant material as a gas or vapor from or to the upper part of the element depending on the temperatures applied to the upper and lower parts. The elements may take various forms such as fins or tubes. The interior of the housing is divided into temperature zones by dividers or by the elements themselves. Fluid media at various temperatures are introduced into or withdrawn from defined sectors of the housing to provide the operative temperature zones for a desired thermal cycle.

As a cooling system, a high temperature input is applied to the lower parts of a series of elements 12 in one sector of the housing. The reactant is desorbed from the absorbent and moves to the upper part of the elements 12 where heat is removed by a fluid medium to an external heat sink (not shown in the drawing). As the series of elements are rotated to another sector of the housing, heat is removed from the lower parts of the elements by heat exchange to a heat sink. Seeking chemical equilibrium, the reactant moves downward to be re-absorbed in the absorbent material, and its evaporation from the upper parts of the elements produces a cooling output, which is utilized to cool an output fluid medium.

Figure 1B:
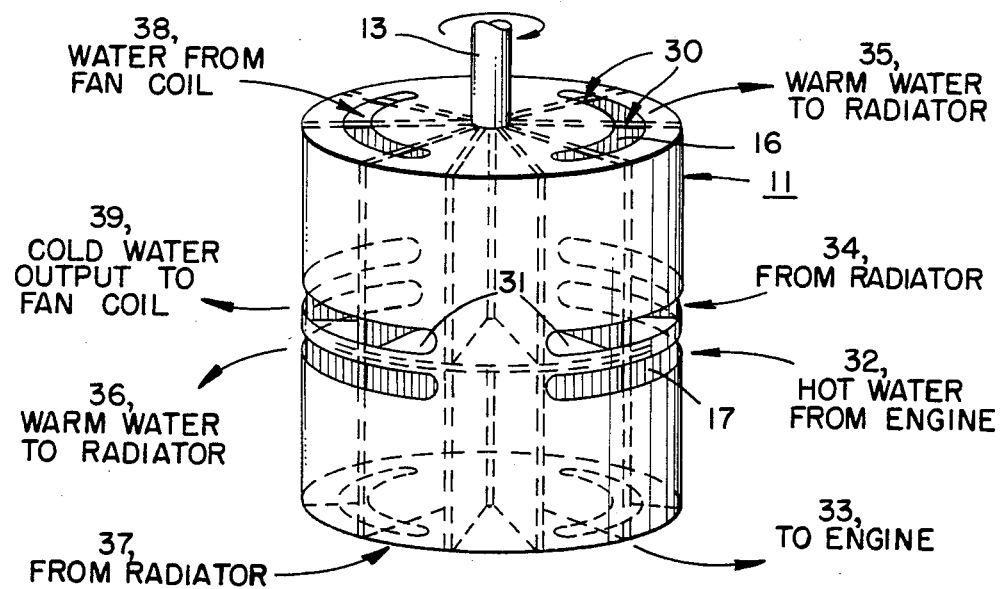
FIG. 1b shows the apparatus of FIG. 1a adapted as a vehicle air conditioner unit.
Figure 2:
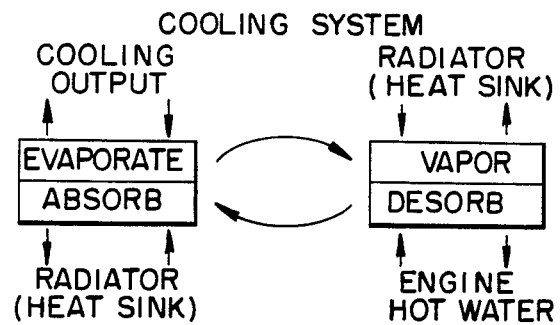
FIG. 2 is a schematic diagram depicting the cooling cycle for the chemisorption apparatus of the invention.

In accordance with the invention, the construction of a vehicle air conditioner is shown in FIG. 1b having a housing 11 and a plurality of vertical fins 30 radially spaced apart at equal intervals and fixed to the drive shaft 13. Attached between each fin at an operative level, for example, the mid-level are horizontal dividers 15 arranged coplanar and in registration with walls of the housing 11 so as to maintain a separation between the upper and lower parts 16 and 17 of the housing. The number and spacing of the fins is determined by the desired thermal input and output, cycling characteristics, and the heat capacity of the absorbent material used in the fins. FIG. 2 shows the thermal cycle for the air conditioning system in block form.

The vehicle air conditioner uses the engine's waste heat as its primary energy input. Referring to FIG. 1b, hot water is circulated from the engine block, at a temperature of about 200° F. to 220° F., through inlet opening 32 over the lower halves of the fins 30. The hot water exits through outlet opening 33. The inlet 32 and outlet 33 are arcuate and extend over several fin intervals, defining a high temperature zone of the apparatus.

The upper parts of the fins are contacted by water circulated from the radiator (not shown in the drawing) through arcuate inlet 34 and outlet 35, which define another temperature zone. Heat is continually removed from the upper parts through the radiator to a heat sink (outside air). The temperature of the upper parts of the fins is in the range of about 80° F. to 135° F. The temperature difference between the upper and lower parts allows the absorbent material in the lower parts of the fins to be desorbed of its chemical reactant. The reactant moves as a gas to the upper part of the fins.

The fins continue to be rotated by the drive shaft 13 to the next part of the thermal cycle. The lower halves of the fins 30 pass through a third temperature zone defined by inlet 37 and outlet 36 for circulation of water from the radiator. In this temperature zone, the lower halves of the fins, heated by the heat input in the high temperature zone, are cooled down to a warm temperature, generally to about 80° F. to 120° F. As the lower halves are cooled, the reactant vapor in the upper halves of the fins move downward, toward chemical equilibrium, for absorption by the absorbent in the lower parts. The evaporation of reactant from the upper parts produces a cooling effect resulting in a temperature in the upper parts of about 30° F. to 60° F. A fluid heat exchange medium, such as water or glycol, is circulated through inlet 38 and outlet 39 to transfer the cooling energy to a conventional fan coil (not shown in the drawing) for the vehicle air conditioner system. Air is cooled by contact with the fan coil and supplied to the passenger compartment. The fins continue to be rotated for the next cooling cycle.

The primary energy input is the waste heat from the engine driving the desorption/absorption cycle. The power demand of the inventive apparatus is therefore very low, consisting only of a small drive for rotating the fin array, for example about one-twentieth horsepower or less, and the drives for the water pumps and air blowers. Thus the high-demand conventional compressor is eliminated, and the conventional radiator can be used both for heat transfer in the described air conditioning system and/or for cooling the engine when the system is not in use.

The chemisorption apparatus described can also be used as a heating system. Although not needed for heating in an automobile, which can be supplied directly through heat exchange with the engine circulation system or exhaust heat, the apparatus of the invention can be used for heating or cooling in other applications where a heat source and a heat sink are available. For example, the apparatus can be used as a heating or cooling system in satellites or space vehicles operating in conditions where solar radiation is available as a heat source and space is the heat sink, or as a solar air conditioner for buildings.

Figure 3:
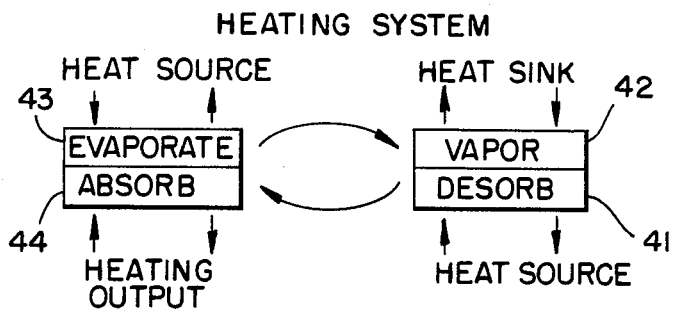
FIG. 3 is a schematic diagram depicting the heating cycle for the chemisorption apparatus of the invention.

Referring to FIG. 3, a heating system of the invention uses a similar absorption and desorption cycle. Heat input from a heat source is used at numeral 41 to desorb the absorbent of the lower halves of the elements 12, and heat is discharged at the upper halves, designated at numeral 42, to a heat sink. The elements are rotated to the absorption phase of the thermal cycle, where the heat source is applied to the upper halves, at numeral 43, driving the reactant for absorption in the lower halves. The sensible heat transferred by the heat of chemical absorption released provides a high temperature output, designated at 44, at the lower halves of the thermal elements.

In effect, the apparatus functions as a thermal energy or heat pump driven by the chemisorption reaction under conditions where a heat source/sink gradient can be utilized. Heat exchange contact with a heat source at one end of the absorption elements and a heat sink at the other end "pumps" thermal energy in one direction (desorption/storage). Reversing the source/sink relationship pumps energy in the other direction (absorption/release), producing a usable thermal output. The apparatus of the invention can also be made modular and concatenated in series where the output of one module is used to drive the chemisorption cycle of the next module, thus providing a range of useful thermal output.

The material used in the described chemisorption apparatus may also be conventional dry or liquid adsorbents, such as silica gel, zeolites, brines, glycols, etc. However, for high capacities of thermal energy transfer and low cost, the invention provides for the improved use of dry chemical absorbents that combine with a reactant gas (usually water vapor) and chemically react into a dry or solid form. These solid-to-solid reactions have the advantages over liquid adsorbents of permitting high mass transfer rates and being usable over a wide range of conditions. Furthermore, they can store and release high levels of exothermic heats of the order of 20,000 calories per mole or higher, which are at least one or more orders of magnitude higher than the potential of known dry or liquid adsorbents utilizing only the physical, rather than chemical, adsorption of water.

According to the invention, preferred dry absorbent materials for use in the chemisorption apparatus include alkaline or alkalinoterrous halides, ammoniacates (with ammonia as the reactant), sodium bioxalate, magnesium oxide, lithium chloride, or calcium chloride. Other dry absorbents and corresponding reactants can be found by selecting chemical equilibrium states suitable for the desired operating conditions.

Figure 4:
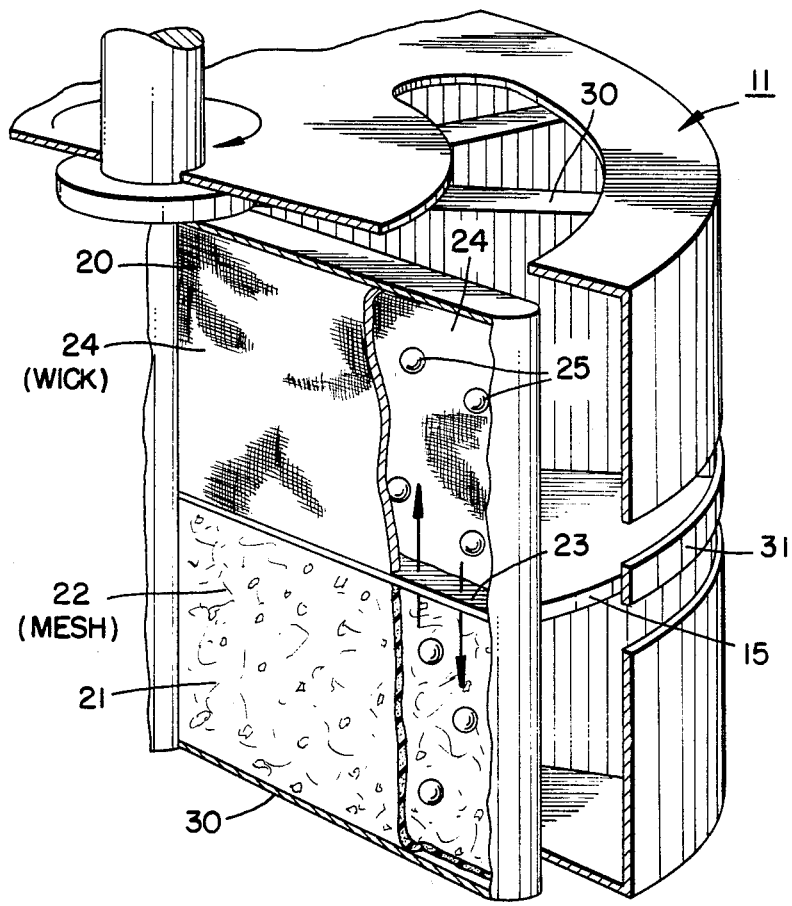

Referring to FIG. 4, a preferred embodiment for the absorbent-containing elements of the apparatus of the invention is shown. Each element or fin 30 is divided into an upper part 20 for the reactant material, which is water vapor for most of the preferred materials, and a lower part 21 for the absorbent material. The fin is preferably evacuated of air so that the efficiency of the chemisorption cycle is enhanced.

The absorbent material is preferably suspended in a porous structure 22 to allow a high level of penetration by the reactant material. The porous structure 22 also retains the absorbent granules apart from each other such that coalescing or clumping together is retarded during the repeated cycles of the thermal element. The structure also serves to retard the effect of deliquescence (for some absorbents) on the particles through repeated water vapor absorption, and extends the useful life of the absorbent. A porous filter or membrane 23, permeable only to reactant material and blocking absorbent molecules, may also be provided between the upper and lower parts to prevent contamination of the upper part with absorbent material.

In the described thermal cycle, water vapor is desorbed and moves to the upper part of the fin. A wick 24 of fabric material may be employed in the upper part to retain greater amounts of desorbed water. During absorption, the water molecules evaporate and provide a cooling output at the upper part of the fin. Absorption in the lower part releases the chemical heat of reaction that is used (heating mode) or removed (cooling mode) in accordance with the invention. The suspension in the mesh of the dry absorbent particles has the advantages of high mass transfer ratios and more complete reaction than for liquid absorbents.

Figure 5:
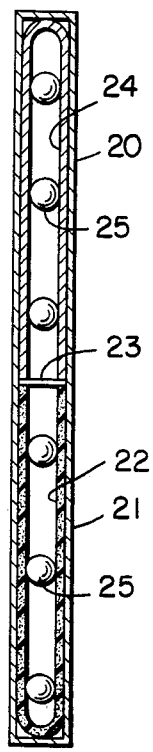
FIG. 5 is a sectional view of the element in FIG. 4.

As shown in FIG. 5, the fin 30 has a thin profile wherein the wire mesh 22 is enfolded against the walls of the lower half, and a layer of the cloth wick 24 is provided for retaining reactant vapor in the upper half. Spacers 25 may be provided for structural support to the walls under pressure due to the vacuum within the fin. The absorbent material may also be mixed in an organic compound or binder, e.g. Teflon, and applied in a layer to the walls of the fin. This form would provide close thermal contact between the absorbent and the fin walls.

A thermodynamic analysis of the apparatus indicates that the typical two to three tons per hour of cooling required for a passenger compartment of an automobile can be met by approximately 350 cubic inches of volume in the thermal element array. Hence, the described air conditioner can be designed as a canister as small as about nine inches diameter and 11 inches length.

The porous structure for the absorbent can take the form of a cloth material, such as chamois, wire mesh, metal or organic sponge, ceramic, or metal foam, such as is available under the trademark Duocel. A suitable air conditioning system might employ 20 to 60 fins a circular array, with a rotational speed of about one revolution per 15 to 30 minutes. It may also be desirable to have a flushing cycle wherein each temperature zone is exposed to a longer temperature contact than normal in order to fully desorb or absorb the reactant material therein. This would be desirable in cases of fins without a filter 23.

Although this invention is described with reference to the above specific materials, steps, and systems, it will be understood that a variety of modifications may be made without departing from the principles of the invention. For example, parts may be reversed, sequences of method steps may be modified, and various equivalent materials may be substituted for those specifically shown and described. All such modifications are intended to be included within the spirit and scope of the invention, which is defined in the following claims.

I claim:

1. A chemisorption apparatus for heating or cooling comprising:
   (a) a housing in right cylindrical form divisible into temperature zones and having inlet and outlet apertures to said zones;
   (b) a plurality of enclosed fins arrayed in a circle radially spaced from each other arranged coaxially with said housing, said array being movable through said temperature zones in a continuous thermal cycle, each of said fins having one part for containing an absorbent material and another part for containing a reactant material, said absorbent material being adapted to combine together with or to disassociate from said reactant material, depending on the temperatures applied to said parts of said fins as they are moved through said temperature zones;
   (c) means for moving said array including a drive shaft to which said fins are mounted for rotation through the temperture zones of said housing; and
   (d) horizontal dividers arranged between each pair of adjacent fins for dividing said housing into an upper part and a lower part, said dividers extending to the housing and being adapted in conjunction with said rotatable fin array to form upper and lower temperature zones through which the array of fins rotates, wherein the absorbent containing parts of the fins constitute the lower parts thereof which are rotated through the lower temperature zone of the housing.

2. The apparatus described in claim 1 adapted as a cooling system, wherein one temperature zone of the lower part of the housing is maintained at a selected high temperature and a corresponding temperature zone in a respective upper part of the housing is maintained at a lower temperature through heat exchange with a heat sink, the reactant material in the fins passing through said zones thereby becoming dissociated from the absorbent material in the lower part of the fins and moving to the upper part thereof, and further wherein another temperature zone of the lower part of the housing is maintained at a lower temperature through heat exchange with a heat sink, the reactant material in the fins passing through said other zone thereby moving from the upper parts of the fins and combining with said absorbent material in the lower parts thereof, whereby a low temperature output is provided at the upper parts of the fins.

3. The apparatus described in claim 1 adapted as a heating system, wherein one temperature zone of the lower part of the housing is maintained at a selected warm temperature and a corresponding temperature zone in a respective upper part of the housing is maintained at a lower temperature through heat exchange with a heat sink, the reactant material in the fins passing through said zones thereby becoming dissociated from the absorbent material in the lower part of the fins and moving to the upper part thereof, and further wherein another temperature zone of the upper part of the housing is maintained at a warm temperature through heat exchange with a heat source, the reactant material in the fins passing through said other zone thereby moving from the upper parts of the fins and combining with said absorbent material in the lower parts thereof, whereby a high temperature output is provided at the lower parts of the fins.

4. The apparatus described in claim 1 wherein the absorbent material is a dry chemical absorbent that combines with the reactant in gaseous form and transforms chemically into a dry, solid form.

5. The apparatus described in claim 1, wherein the absorbent is an alkaline or alkalinoterrous halide, and the reactant is water vapor.

6. The apparatus described in claim 1, wherein the absorbent is calcium chloride, and the reactant is water vapor.

7. The apparatus described in claim 1, wherein the absorbent is lithium chloride, and the reactant is water vapor.

8. The apparatus described in claim 1, wherein the absorbent is an ammoniacate, and the reactant is ammonia.

9. The apparatus described in claim 1, wherein the absorbent is sodium bioxalate, and the reactant is water vapor.

10. The apparatus described in claim 1, wherein the absorbent is magnesium oxide, and the reactant is water vapor.

11. A chemisorption air conditioning apparatus for use in conjunction with a waste heat generating source such as a vehicle engine comprising:
    (a) a cylindrical housing divisible into temperature zones and having inlet and outlet apertures to said zones;
    (b) a plurality of enclosed fins arrayed in a circle radially spaced from each other, said array of fins being mounted to a drive shaft coaxial with said housing for rotation through the temperature zones of said housing in a continuous thermal cycle, each of said fins having one part for containing an absorbent material and another part for containing a reactant material, said absorbent material being adapted to combine together with or to disassociate a reactant material, depending on the temperatures applied to said parts of said fins as they are moved through said temperature zones;
    (c) means for rotating said array of fins in a continuous thermal cycle through said temperature zones; and
    (d) horizontal dividers arranged between each pair of adjacent fins for dividing said housing into an upper part and a lower part, said dividers extending to the housing and being adapted in conjunction with said rotatable fin array to form upper and lower temperature zones through which the array of fins rotates, wherein the absorbent containing parts of said fins constitute the lower parts thereof which are rotated through the lower temperature zones of the housing.

12. The chemisoption apparatus described in claim 11 wherein the absorbent material is selected from a group consisting of an alkaline material, an alkalinoterrous halide, an ammoniacate, sodium dioxalate, and magnesium oxide.

13. The chemisorption air conditioning apparatus described in claim 11 adapted as a cooling system, wherein one temperature zone of the lower part of the housing is supplied with a high temperature input and a corresponding temperature zone in a respective upper part of the housing is maintained at a lower temperature through heat exchange with a heat sink, the reactant material in the fins passing through said zones thereby becoming dissociated from the absorbent material in the lower part of the fins and moving to the upper part thereof, and further wherein another temperature zone of the lower part of the housing is maintained at a lower temperature through heat exchange with a heat sink, the reactant material in the fins passing through said other zone thereby moving from the upper parts of the fins and combining with said absorbent material in the lower parts thereof, whereby a low temperature output is provided at the upper parts of the fins.

14. The chemisorption air conditioning apparatus described in claim 11, wherein waste heat transferred through circulated fluid from the vehicle's engine supplies the high temperature input for the lower part of said one temperature zone.

15. The chemisorption air conditioning apparatus described in claim 11, wherein the lower temperature in the upper part of said one temperature zone and the lower temperature in the lower part of said other temperature zone are maintained by fluid heat exchange through a radiator system for the vehicle to the ambient air as the heat sink.

16. The apparatus described in claim 11 wherein the absorbent material is a dry chemical absorbent that combines with the reactant in gaseous form and transforms chemically into a dry, solid form.

17. A chemisorption apparatus for heating or cooling comprising:
   (a) a cylindrical housing divisible into temperature zones and having inlet and outlet apertures to said zones;
   (b) an array of thermal elements rotatable about a longitudinal axis of said cylindrical housing so as to rotate said thermal elements through said temperature zones, each thermal element being constructed so as to enclose a sealed, self-contained volume wherein a first portion of said volume includes means for holding an absorbent material therein and a second portion of said volume includes means for receiving a reactant material disassociated from the absorbent material, said absorbent and reactant materials being selected to combine together or to disassociate depending on the temperatures applied to said portions of said thermal elements as they are rotated through said temperature zones;
   (c) a partition for dividing said housing into a first temperature zone through which the absorbent containing first portions of said thermal elements are rotated and a second temperature zone through which the reactant containing second portions of said thermal elements are rotated;
   (d) means for dividing each of said first and second temperature zones into two temperature subzones, wherein the subzones of one of said temperature zones comprise a high temperature subzone and an intermediate temperature subzone, and the subzones of the other of said temperature zones comprise another intermediate temperature subzone and a low temperature subzone; and
   (e) means for rotating said array of thermal elements in a continuous cycle through said temperature zones.

18. The chemisorption apparatus described in claim 17 adapted as a cooling system, wherein said first temperature zone comprises said high temperature subzone and said intermediate temperature subzone, and said second temperature zone comprises said other intermediate temperature subzone and said low temperature subzone, whereby the absorbent containing first portions of the thermal elements rotate through said high temperature subzone so as to disassociate reactant material to the reactant containing second portions of said thermal elements which rotate through the other intermediate temperature subzone of said second temperature zone during one part of said continuous cycle, and said absorbent containing first portions then rotate through said intermediate temperature subzone of said first temperature zone so as to reabsorb the reactant material from the reactant containing second portions of said thermal elements which rotate through said low temperature subzone of said second temperature zone during another portion of said continuous cycle, whereby a cooling output of the system is provided at said low temperature subzone.

19. The chemisorption apparatus described in claim 17 adapted as a heating system, wherein said first temperature zone comprises said high temperature subzone and said intermediate temperature subzone, and said second temperature zone comprises said other intermediate temperature subzone and said low temperature subzone, whereby the absorbent containing first portions of the thermal elements rotate through said intermediate temperature subzone so as to disassociate reactant material to the reactant containing second portions of said thermal elements which rotate through the low temperature subzone of said second temperature zone during one part of said continuous cycle, and said absorbent containing first portions then rotate through said high temperature subzone of said first temperature zone while reabsorbing the reactant material from the reactant containing second portions of said thermal elements which rotate through said other intermediate temperature subzone during another portion of said continuous cycle, whereby a heating output of the system is provided at said high temperature subzone.

20. The chemisorption apparatus described in claim 18 adapted as an air conditioning system for a vehicle having a waste heat source, such as a cooling system for an engine of said vehicle, and a heat discharging sink, such as a radiator system of said vehicle, wherein said high temperature subzone is maintained by said waste heat source, one or both of said intermediate temperature subzones is maintained by said heat discharging sink, and the cooling output of said low temperature subzone is provided for cooling a passenger compartment of said vehicle.

21. The chemisorption apparatus described in claim 17 wherein the absorbent material is a dry chemical absorbent which combines with the reactant material in gaseous form so as to transform chemically into a dry, solid form.

22. The chemisorption apparatus described in claim 17 wherein the absorbent material is selected from a group consisting of an alkaline material, an alkalinoterrous halide, an ammoniacate, sodium dioxalate, and magnesium oxide.

23. The apparatus of claim 17 further comprising means for performing a flushing operation within the thermal elements wherein excess reactant material in said reactant containing part is driven back into said absorbent containing part during a flushing cycle.

24. The apparatus described in claim 17, wherein the absorbent is in a dry particle or granular form, and the absorbent retaining means is a porous structure in the lower part of each element for suspending the absorbent therein.

25. The apparatus described in claim 17, wherein the reactant part defining means includes a wick arranged in the reactant part of each element.

26. The apparatus described in claim 17, further comprising a filter permeable only to molecules of the reactant material arranged between said absorbent retaining part and said reactant retaining part of each element.

27. The apparatus described in claim 17, wherein the absorbent retaining means is an organic resin compound or binder mixed with the absorbent and applied in a layer to the walls of the lower part of each element.

* * * * *